A. ULLMANN.
NUT LOCK.
APPLICATION FILED SEPT. 27, 1907.
906,475.
Patented Dec. 8, 1908.
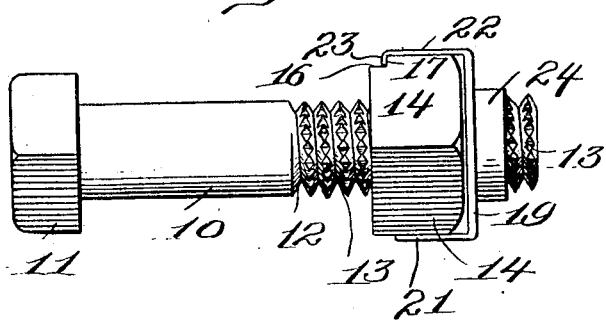
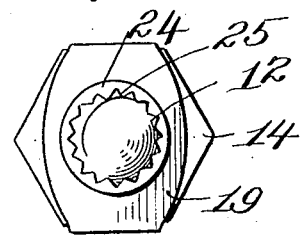
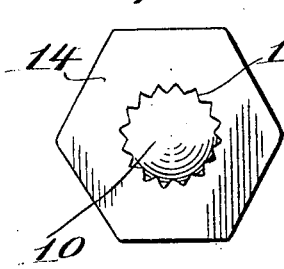
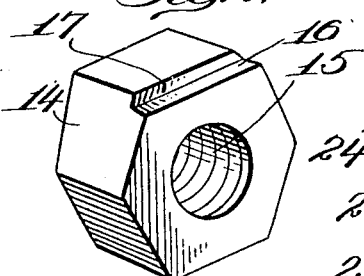
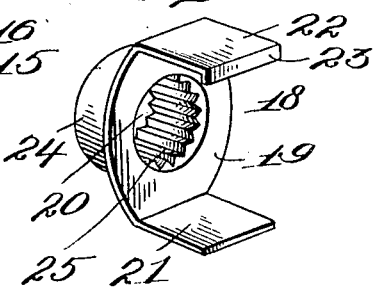
Witnesses:
Inventor
Albert Ullmann
By James L. Norris
Atty

UNITED STATES PATENT OFFICE.

ALBERT ULLMANN, OF MACON, GEORGIA.

NUT-LOCK.

No. 906,475.  Specification of Letters Patent.  Patented Dec. 8, 1908.

Application filed September 27, 1907. Serial No. 394,912.

*To all whom it may concern:*

Be it known that I, ALBERT ULLMANN, a citizen of the United States, residing at Macon, in the county of Bibb and State of Georgia, have invented new and useful Improvements in Nut-Locks, of which the following is a specification.

This invention relates to nut locks, and one of the objects thereof is to provide a nut lock in a manner as hereinafter set forth, whereby the nut will be prevented from rotating backwardly upon the bolt and furthermore to simplify and improve the construction and to produce a nut lock which may be inexpensively constructed, easily applied and operated, and by means of which the nut may be rotatably connected to the bolt and effectually prevented from backward rotation no matter how severe the jars and concussions may be to which it is subjected.

Further objects of the invention are to provide a nut lock, in a manner as hereinafter set forth, which shall be extremely simple in its construction, strong, durable, efficient in its use, readily set up and inexpensive to manufacture.

With the foregoing and other objects in view, the invention consists of the novel construction, combination and arrangement of parts, hereinafter more specifically described and illustrated in the accompanying drawings, wherein is shown the preferred embodiment of the invention, but it is to be understood that changes, variations and modifications can be resorted to which come within the scope of the claims hereunto appended.

In describing the invention in detail, reference is had to the accompanying drawings, wherein like reference characters denote corresponding parts throughout the several views, and in which:—

Figure 1 is a side elevation of a nut lock in accordance with this invention. Fig. 2 is an end view thereof. Fig. 3 is an end view with the locking washer removed. Fig. 4 is a perspective view of the nut. Fig. 5 is a perspective view of the locking washer.

Referring to Figs. 1 to 5 of the drawings, the bolt forming one of the elements of the nut lock is indicated by the reference character 10 and is provided at one end with a head 11, while at its other end it is provided with a screw threaded portion 12, the whirls of the thread being formed with grooves 13, extending transversely thereof. The screw threaded portion 12 is cylindrical throughout. The grooves 13 of the whirls are so disposed as to extend in longitudinal alinement with respect to the axis of the bolt. The thread is V shaped in cross-section, and the grooves 13 are disposed, throughout the length of the thread arranged in close proximity to each other. Mounted upon the screw threaded portion 12 of the bolt 10 is a nut 14, constituting another element of the nut lock. The nut is formed with a screw threaded opening 15, the threads of which being adapted to engage with the screw threaded portion 12. The marginal portion of the inner face of the nut at one side is cut away as at 16, forming thereby a shoulder 17, the function of which will be hereinafter referred to. Mounted upon that portion of the bolt, which projects from the outer face of the nut 14, is a locking washer, referred to generally by the reference character 18, and which forms the other locking element of the nut lock. The locking washer 18 comprises a body portion 19, formed with a centrally disposed opening 20 to permit of the mounting of the said body portion 19 upon the bolt 10. One side of the body portion 19 terminates in an angularly disposed wing 21, while the other side of said body portion 19 terminates in an angularly disposed wing 22, having its free end bent inwardly as at 23 to form a locking flange, and which is adapted to engage the shoulder 17 when the locking washer 18 is mounted in operative relation in respect to the nut 14, to hold the washer from longitudinal movement. The wing 22, as well as the wing 21, provide means adapted to engage the sides of the nut, to prevent the turning of the latter, when the locking washer 18 is mounted upon the bolt 10, and the flange 23 engages against the shoulder 17. Projecting laterally from the outer face of the body portion 19 is a collar 24, the inner diameter thereof being somewhat smaller than the diameter of the opening 20 and by this arrangement the mounting of the washer upon the bolt is facilitated. The inner face of the collar 24 is provided with an annular series of longitudinally extending permanent teeth 25 arranged in close proximity to each other, adapted when the locking washer is mounted upon the bolt 10 to engage in the longitudinally extending grooves 13, formed in the screw threaded portion 12 of the bolt 10, and, by such an arrangement, the washer 18 is prevented from turning upon the bolt and consequently, if the nut 14 starts to turn, the wings 21 and 22 will arrest the turning movement of the nut as will be evident, in view of the fact that the teeth 25 prevent the turning of the washer 18. By setting up the grooves of the bolt and the teeth of the locking washer in the manner as referred to, the washer is capable of minute fractional adjustment around the bolt relative to the position of the nut.

In the construction shown the nut may be easily released when the locking member or washer is disconnected through the medium of a suitable instrument.

It is evident that a nut lock in accordance with this invention is very simple in construction, and can be applied to all the various forms and sizes of bolts and nuts, and to those employed for all purposes requiring the application of a locking attachment to the nut. In its precise details of construction, it presents an improvement over prior devices of a similar character.

The flanged wing of the locking washer when in engagement with the shoulder 17 not only holds the washer from longitudinal movement, but also retains the washer upon the bolt and under such conditions it is evident that the nut is prevented from back rotation as the washer engages with the threads of the bolt, while the flanged wing of the washer engages with the shoulder of the nut.

What I claim is:—

1. A nut lock comprising a bolt having a screw-threaded portion cylindrical throughout and with the whirls of the threads provided with grooves extending in parallelism with respect to the axis of the bolt, said grooves arranged in close proximity to each other, a nut mounted upon said screw-threaded portion and having one side formed with a shoulder arranged in proximity to the inner face of the nut, a locking washer mounted against the outer face of the nut and having projecting from its outer face a collar, said collar having its inner face formed throughout with a series of longitudinally extending permanent teeth adapted to engage in the grooves of the bolt, said teeth arranged in close proximity to each other and whereby in connection with the grooves of the bolt said washer is capable of minute fractional adjustment around the bolt relative to the position of the nut, said washer further provided with a resilient retaining wing extending towards the shouldered portion of the nut and provided with a flange adapted to take over said shoulder thereby preventing the shifting of the washer longitudinally upon the bolt, said toothed sleeve preventing the turning of the washer upon the bolt and said wing in connection with said shoulder preventing the turning of the nut upon the bolt.

2. A nut lock comprising a bolt having a screw-threaded portion with the whirls of the threads provided with grooves extending in parallelism with respect to the axis of the bolt, said grooves arranged in close proximity to each other, a nut mounted upon said screw-threaded portion and having one side formed with a shoulder, a locking washer mounted against the outer face of the nut and having projecting from its outer face a collar, said collar having its inner face formed throughout with a series of longitudinally extending permanent teeth adapted to engage in the grooves of the bolt, said teeth arranged in close proximity to each other and whereby in connection with the grooves of the bolt said washer is capable of minute fractional adjustment around the bolt relative to the position of the nut, said washer further provided with a resilient retaining wing extending towards the shouldered portion of the nut and provided with a flange adapted to take over said shoulder thereby preventing the shifting of the washer longitudinally upon the bolt, said toothed sleeve preventing the turning of the washer upon the bolt and said wing in connection with said shoulder preventing the turning of the nut upon the bolt.

3. A nut lock comprising a bolt having a screw-threaded portion cylindrical throughout and with the whirls of the threads provided with grooves extending in parallelism with respect to the axis of the bolt, said grooves arranged in close proximity to each other, a nut mounted upon said screw-threaded portion and having one side formed with a shoulder arranged in proximity to the inner face of the nut, a locking washer mounted against the outer face of the nut and having projecting from its outer face a collar, said collar having its inner face formed throughout with longitudinally extending permanent teeth adapted to engage in the grooves of the bolt, said teeth arranged in close proximity to each other and whereby in connection with the grooves of the bolt said washer is capable of minute fractional adjustment around the bolt relative to the position of the nut, said washer further provided with a resilient retaining wing extending towards the shouldered portion of the nut and provided with a flange adapted to take over said shoulder thereby preventing the shifting of the washer longitudinally upon the bolt, said toothed sleeve preventing the turning of the washer upon the bolt and said wing in connection with said shoulder preventing the turning of the nut upon the bolt and said washer further provided with a resilient wing engaging another side of the nut and arranged opposite the flanged wing.

4. A nut lock comprising a bolt having a screw-threaded portion cylindrical throughout and with the whirls of the threads provided with grooves extending in parallelism with respect to the axis of the bolt, said grooves arranged in close proximity to each other, a nut mounted upon said screw-threaded portion and having one side formed with a shoulder, a locking washer mounted against the outer face of the nut and having projecting from its outer face a collar, said collar having its inner face formed throughout with longitudinally extending permanent teeth adapted to engage in the grooves of the bolt, said teeth arranged in close proximity to each other and whereby in connection with the grooves of the bolt said washer is capable of minute fractional adjustment around the bolt relative to the position of the nut, said washer further provided with a resilient retaining wing extending towards the shouldered portion of the nut and provided with a flange adapted to take over said shoulder thereby preventing the shifting of the washer longitudinally upon the bolt, said toothed sleeve preventing the turning of the washer upon the bolt and said wing in connection with said shoulder preventing the turning of the nut upon the bolt and said washer further provided with a resilient wing engaging another side of the nut and arranged opposite the flanged wing.

5. A nut lock comprising a bolt having a screw-threaded portion with the whirls of the thread provided with grooves extending in parallelism with respect to the axis of the bolt, said grooves arranged in close proximity to each other, a nut mounted upon said screw-threaded portion and having one side formed with a shoulder arranged in close proximity to the inner face of the nut, a locking washer mounted against the outer face of the nut having projecting from its outer face a collar, said collar having its inner face formed throughout with a series of longitudinally-extending permanent teeth adapted to engage in the grooves of the bolt, said teeth arranged in close proximity to each other and whereby in connection with the grooves of the bolt said washer is capable of minute fractional adjustment around the bolt relative to the position of the nut, the diameter of the opening of the washer being greater than the inner diameter of said collar, the wall of the opening of the washer being smooth throughout, said washer further provided with a resilient wing extending towards the shouldered portion of the nut and provided with a flange adapted to take over said shoulder thereby preventing the shifting of the washer longitudinally upon the bolt, said toothed sleeve preventing the turning of the washer upon the bolt, and said wing in connection with said shoulder preventing the turning of the nut upon the bolt.

6. A nut lock comprising a bolt having a screw-threaded portion with the whirls of the thread provided with grooves extending in parallelism with respect to the axis of the bolt, said grooves arranged in close proximity to each other, a nut mounted upon said screw-threaded portion and having one side formed with a shoulder, a locking washer mounted against the outer face of the nut and having projecting from its outer face a collar, said collar having its inner face formed throughout with a series of longitudinally-extending permanent teeth adapted to engage in the grooves of the bolt, said teeth arranged in close proximity to each other and whereby in connection with the grooves of the bolt said washer is capable of minute fractional adjustment around the bolt relative to the position of the nut, the diameter of the opening of the washer being greater than the inner diameter of the collar, whereby the positioning of the washer upon the bolt is facilitated, said washer further provided with a resilient retaining wing extending towards the shouldered portion of the nut and further provided with a flange adapted to take over said shoulder, thereby preventing the shifting of the washer longitudinally upon the bolt, said toothed sleeve preventing the turning of the washer upon the bolt and said wing in connection with said shoulder preventing the turning of the nut upon the bolt.

7. A nut lock comprising a bolt having a screw-threaded portion with the whirls of the thread provided with grooves extending in parallelism with respect to the axis of the bolt, said grooves arranged in close proximity to each other, a nut mounted upon said screw-threaded portion and having one side formed with a shoulder arranged in close proximity to the inner face of the nut, a locking washer mounted against the outer face of the nut having projecting from its outer face a collar said collar having its inner face formed throughout with a series of longitudinally-extending permanent teeth adapted to engage in the grooves of the bolt, said teeth arranged in close proximity to each other and whereby in connection with the grooves of the bolt said washer is capable of minute fractional adjustment around the bolt relative to the position of the nut, the diameter of the opening of the washer being greater than the inner diameter of said collar, the wall of the opening of the washer being smooth throughout, said washer further provided with a resilient retaining wing extending towards the shouldered portion of the nut and provided with a flange adapted to take over said shoulder thereby preventing the shifting of the washer longitudinally upon the bolt, said toothed sleeve preventing the turning of the washer upon the bolt and said wing in connection with said shoulder preventing the turning of the nut upon the bolt, and said washer further provided with a resilient wing engaging another side of the nut and arranged opposite the flanged wing.

8. A nut lock comprising a bolt having a screw-threaded portion with the whirls of the thread provided with grooves extending in parallelism with respect to the axis of the bolt, said grooves arranged in close proximity to each other, a nut mounted upon said screw-threaded portion and having one side formed with a shoulder, a locking washer mounted against the outer face of the nut and having projecting from its outer face a collar, said collar having its inner face formed throughout with a series of longitudinally-extending permanent teeth adapted to engage in the grooves of the bolt, said teeth arranged in close proximity to each other and whereby in connection with the grooves of the bolt said washer is capable of minute fractional adjustment around the bolt relative to the position of the nut, the diameter of the opening of the washer being greater than the inner diameter of the collar, whereby the positioning of the washer upon the bolt is facilitated, said washer further provided with a resilient retaining wing extending towards the shouldered portion of the nut and further provided with a flange adapted to take over said shoulder, thereby preventing the shifting of the washer longitudinally upon the bolt, said toothed sleeve preventing the turning of the washer upon the bolt, said wing, in connection with said shoulder preventing the turning of the nut upon the bolt, said washer further provided with a resilient wing engaging another side of the nut and arranged opposite the flanged wing.

In testimony whereof I have hereunto set my hand in presence of two subscribing witnesses.

ALBERT ULLMANN.

Witnesses:
J. L. FLEISCHER,
JEROME HERMAN.